M. G. ZOELLER.
GEAR LOCKING MECHANISM.
APPLICATION FILED SEPT. 6, 1917.
1,294,858.
Patented Feb. 18, 1919.
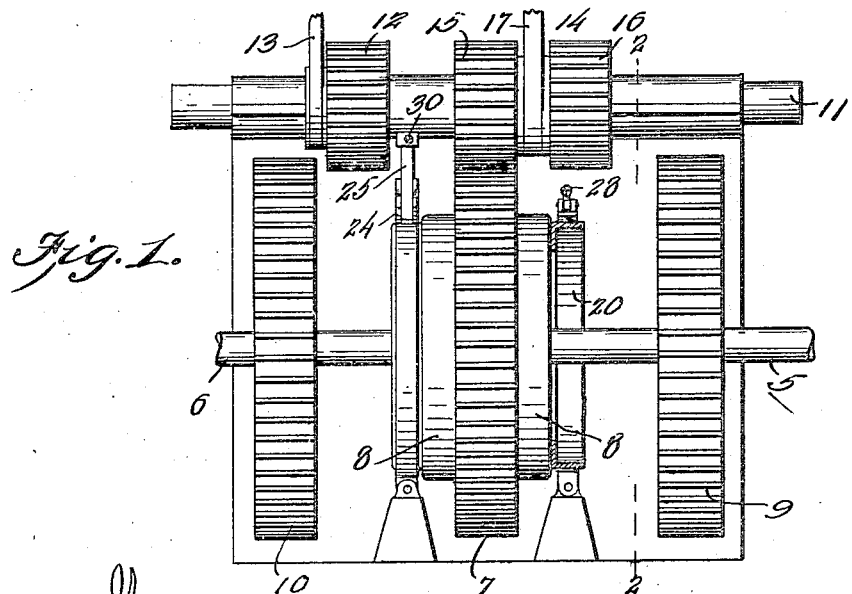
Fig. 1.
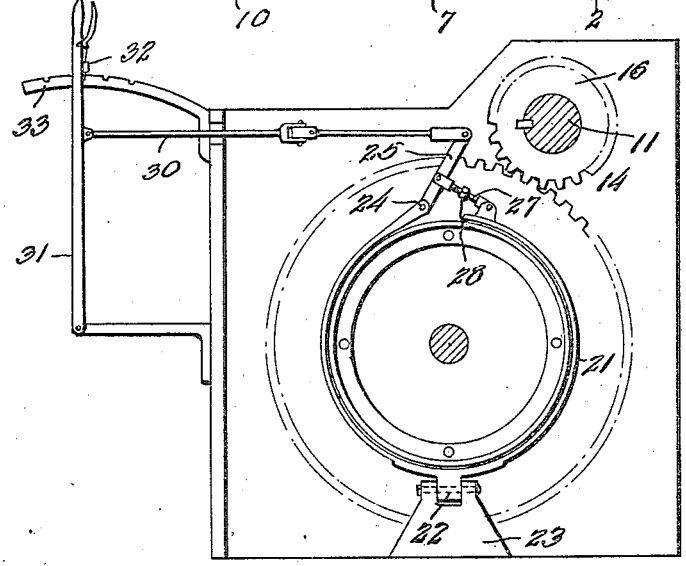
Fig. 2.
Fig. 3
WITNESSES
INVENTOR
Milton G. Zoeller.
BY
ATTORNEY

UNITED STATES PATENT OFFICE.

MILTON G. ZOELLER, OF PRESTON, NEBRASKA.

GEAR-LOCKING MECHANISM.

1,294,858.  Specification of Letters Patent.  Patented Feb. 18, 1919.

Application filed September 6, 1917. Serial No. 190,032.

*To all whom it may concern:*

Be it known that I, MILTON G. ZOELLER, a citizen of the United States, residing at Preston, in the county of Richardson and State of Nebraska, have invented certain new and useful Improvements in Gear-Locking Mechanism, of which the following is a specification.

This invention relates to gear locking mechanism, and is adapted particularly for use in connection with the power transmission mechanism for motor vehicles, such as tractors.

The primary object of the invention is to provide improved means for establishing a driving connection between the power wheels of the vehicle and the power plant therefor, so that the power plant may rotate the driving wheels for the vehicle in opposite directions, to enable the vehicle to make short turns.

A further object of the invention is to provide a mechanism of the character set forth which may be utilized as a braking means whereby the driving wheels of the vehicle can be locked against rotation.

A still further object of the invention is to provide improvements in transmission gearing, and includes means of an improved nature for making and breaking the power connection in the various gears.

With these objects in view together with others which will appear as the description proceeds, the invention resides in the novel formation, combination and arrangement of parts all as will be described more fully hereinafter, illustrated in the drawings and particularly pointed out in the claim.

In the drawings:

Figure 1 is an elevation of a conventional form of transmission gearing and illustrating the application thereto of a braking means constructed in accordance with the invention, Fig. 2 is a sectional view taken on line 2—2 of Fig. 1, and Fig. 3 is a plan view of the brake actuating mechanism.

The invention is illustrated as being used in connection with a conventional form of power transmission mechanism, and wherein there is shown an axle comprising independently rotatable sections 5 and 6, respectively, each section being adapted to have secured thereto one of the driving wheels for the vehicle. The abutting inner ends of these axle sections are inclosed by a gear 7, the latter having bolted upon its opposite faces housing members 8 for covering the planetary gearing constituting the differential mechanism. Each of the axle sections also has rigidly affixed thereto a relatively large gear, one of said gears being indicated at 9 and 10, respectively.

Arranged adjacent the axle of the vehicle and in spaced parallel relation thereto is a jack or power shaft 11. This jack shaft is provided adjacent one end with a longitudinally movable pinion 12, the latter being controlled in its movement longitudinally of the shaft by an operating arm 13, and this pinion is adapted to be moved into and out of mesh with the gear 10. As is shown in the drawings, this pinion 12 is keyed to the power shaft.

A double pinion 14 is also keyed upon the power or jack shaft 11, and the pinion portion 15 is adapted to mesh with the gear 7, while the portion 16 is adapted to mesh with the gear 9. This double pinion is controlled in its sliding movement by the arm indicated at 17. It will be observed that the double pinion is arranged in such manner that only one of the said pinions can be in mesh with one of the gears 7 and 9 at one time, and it is also obvious that the lever 17 may be operated so as to bring either of the pinion portions 15 or 16 into engagement with their respective gears 7 or 9. Power may be delivered to the shaft 11 in any preferred manner, and when the gear 12 is moved into mesh with the gear 10, and the gear portion 15 disengaged from the gear 7, the rotary movement in the shaft 11 will be transmitted to the axle portion 6, while the axle portion 5 is idle. On the other hand, when the gear 12 is disengaged from the gear 10, and the gear portion 16 is in mesh with the gear 9, the axle portion 5 will be positively driven, while the portion 6 will be idle. When the pinions are in the position indicated in Fig. 1 of the drawings, that is, with the pinions 12 and 16 disengaged from the gears 10 and 9, and the pinion 15 engaged with the gear 7, rotary movement in the shaft 11 will be transmitted to the gear 7, and by reason of the differential gearings inclosed by the housing 8 both shaft or axle sections 5 and 6 will be driven at uniform speed. The differential mechanism which is inclosed by the housing 8 is of conventional form, and it is to be understood that the differential mechanism permits of one shaft section rotating faster than the other.

Secured upon the outer faces of the housing 8 for the differential mechanism are brake drums 20, the said drums constituting annular members arranged concentric with the vehicle axle, and providing outwardly projecting flanges over which the brake bands 21 engage. Each brake band is provided intermediate its ends with a block portion 22, which fits within a base 23 fixed adjacent the axle of the vehicle. A lever is pivoted at one end as at 24 to one end of the brake band, the said lever being indicated at 25, and the opposite end of the said lever is connected to the forward end of a rod 26. A link 27 connects the lever 25 intermediate the ends thereof with the opposite end of the brake band 21, and it is obvious that a rearward pull delivered to the rod 26 will cause the band to tightly bind upon the brake drum. The link 27 includes a screw-member 28, so that the length of the said link may be varied as desired.

Each of the brake drums is provided with a band of the above described character, and in order to enable both bands to be operated simultaneously, a brake bar 29 is provided. To the opposite ends of this brake bar are pivotally connected the rear ends of the rods 26, and the said bar is pivotally connected intermediate its ends to a rearwardly extending rod 30. The rod 30 is connected to a lever 31 which is pivoted adjacent the gearing mechanism and which is provided with a latch 32 which plays over a segment 33, whereby the lever may be held in various positions of adjustment. It is obvious from this construction that either forward or rearward movement of the lever 31 will cause the brake actuating rods 26 to move in unison, so that the degree of frictional engagement of each of the bands 21 with their respective drums will be equal.

Should it be desired to rotate the axle sections 5 and 6 in opposite directions and at a uniform rate of speed, the pinion 12 would be moved into engagement with the gear 10, and the double pinion 14 would be moved so that the portion 15 would be disengaged from the gear 7, but the said double pinion would not be moved to such extent as to engage the gear section 16 with the gear 9. When the pinions have been moved in this manner, the lever 31 is moved rearwardly whereupon the brake bands 21 bind upon the drums 20, holding the gear 7 against rotation. By locking the differential mechanism in this manner, it is obvious that the differential mechanism will operate to transform the rotary movement in the shaft section 6 into similar movement in opposite directions in the shaft section 5. The reverse of this operation may be accomplished by moving the pinion 12 out of mesh with the gear 10, and moving the pinion 15 into engagement with the gear 9.

It is obvious from this construction that I have provided an exceedingly simple and yet thoroughly efficient means for developing the desired speeds and directions of rotation in the axle sections. Should it be desired to lock both of the shaft or axle sections 5 and 6 against movement in either direction, as might be found necessary in making a sudden stop, the gear 15 will be enmeshed with the gear 7, and the brake 21 will be applied. This application of the brakes will hold the gear 7 against rotation, and therefore the differential mechanism will lock the shafts against rotation.

While the present is a disclosure of the preferred embodiment of the invention, it is to be understood that the invention is not limited thereto, as various changes in the minor details of construction, proportion and arrangement of parts may be resorted to if desired without departing from the spirit of the invention as defined by the appended claim.

What is claimed is:

In a device of the class described, a pair of independently rotatable alined shafts, a power shaft parallel with said first mentioned shafts, a differential mechanism connecting the adjacent ends of said shafts, a casing inclosing said mechanism, a gear carried by said casing, a gear on each of said independently rotatable shafts, pinions slidable longitudinally on said power shaft and being adapted to be engaged with one of said shaft gears, a pinion on said power shaft adapted to engage said differential gear, and means for moving one of the gear engaging pinions simultaneously with said differential gear engaging pinion.

In testimony whereof I affix my signature in presence of two witnesses.

MILTON G. ZOELLER.

Witnesses:
J. R. BILES,
GUY P. GREENWALD.